United States Patent [19]

Ozaki

[11] Patent Number: 5,260,887
[45] Date of Patent: Nov. 9, 1993

[54] BIT DATA SHIFT AMOUNT DETECTOR

[75] Inventor: Yasushi Ozaki, Tokyo, Japan

[73] Assignee: NEC Corporation, Tokyo, Japan

[21] Appl. No.: 889,773

[22] Filed: May 28, 1992

[30] Foreign Application Priority Data

May 29, 1991 [JP] Japan .................................. 3-124240

[51] Int. Cl.$^5$ .............................................. G06F 5/01
[52] U.S. Cl. ................................................ 364/715.04
[58] Field of Search ................. 364/715.04, 715.1, 748

[56] References Cited

U.S. PATENT DOCUMENTS

| | | | |
|---|---|---|---|
| 4,553,220 | 11/1985 | Swanson | 364/715.04 |
| 4,947,358 | 8/1990 | Lamere et al. | 364/715.04 |
| 5,126,963 | 6/1992 | Fukasawa | 364/715.04 |
| 5,153,851 | 10/1992 | Kanazawa et al. | 364/715.04 |

*Primary Examiner*—David M. Malzahn
*Attorney, Agent, or Firm*—Whitham & Marhoefer

[57] ABSTRACT

This shift amount detector determines the shift amount to normalize binary bit data. It is provided with means to add, to an n bit data to be normalized, at least one bit of logical value "0" on the side of the least significant bit. The data with additional logical value "0" has its bits reversed by the bit reversing circuit when the data is negative or positive. The data with the additional logical value "0" is input to the bit detecting circuit as it is or as data with reversed bits according to the selection by the selecting circuit. The bit detecting circuit detects the bit position where "1" or "0" appears for the first time by searching the bits one by one starting from the most significant bit and outputs the result of detection to the shift amount calculating circuit. The shift amount calculating circuit determines the shift amount based on the detected bit position.

4 Claims, 3 Drawing Sheets

BIT DATA SHIFT AMOUNT DETECTOR

BACKGROUND OF THE INVENTION

1. Field of the Invention

This invention relates to a shift amount detector to determine the shift amount when bit data is shifted for normalization of operation data in arithmetic and logic unit.

2. Description of the Prior Art

In arithmetic and logic operation, data may be shifted for normalization. For example, n (this may be an arbitrary natural number) bits of twos complement data may be normalized by shifting to the left for a certain number of bits. In such a case, a shift amount detecting circuit has been conventionally used to determine the amount of shifting to the left. A conventional shift amount detecting circuit inputs the data as it is if the input data is positive or the data with all bits reversed if it is negative to a bit detecting circuit, which detects the bit position where the bit takes the logical value "1" for the first time. Such a bit detecting circuit checks the values of the data bits starting from the most significant bit and going down to the least significant bit one by one, in order to detect the bit position where the bit value becomes "1" for the first time. The amount of shifting to the left for normalization is determined from the bit position thus detected.

When all bits of an input data consisting of n bits are "1", i.e. the input data is "FFF ... FH (=1111 ... 1)" (H indicates that the value is given in hexadecimal notation), the normalization result "100 ... 0" should be obtained by shifting to the left for (n−1) bits. In a conventional unit, however, since the input data "FFF ... FH" (+1111 ... 1) is negative, the value with all data bits reversed ("000 ... 0H") is input to the bit detecting circuit above. This is the same value as that for input data "000 ... 0H" and the bit detecting circuit cannot detect the bit position where the bit value becomes "1". This causes the shift amount to the left to be 0. Thus, a conventional unit needed a circuit for exception processing to provide (n−1) as the shift amount to the left irrespective of the detection result by the bit detecting circuit only when input data is "FFF ... FH".

As described above, conventional unit configuration requires exception processing to provide (n−1) as the shift amount when the input data is "FFF ... FH". The circuit for this exception processing checks all bits of the input data to see if it is "FFF ... FH", and when it detects that the data is "FFF ... FH", it sets the shift amount to the left to (n−1). This complicated processing extends the time required to determine the shift amount, which results in decrease in operation speed at the unit.

SUMMARY OF THE INVENTION

An object of the present invention is to provide a bit data shift amount detector which eliminates the need of troublesome exception processing for particular input data in determination of shift amount for normalization of operation data, thereby enabling prompt determination of shift amount by the same procedure for all input data to improve the operation speed.

According to a preferred embodiment of the present invention to attain this object, a shift amount detector to determine the shift amount for normalization of binary bit data comprises adding means to add a logical value "0" consisting of at least one bit at the side of the least significant bit of an n bit input data to be normalized, bit reversing means to reverse the bits of a data when the data to which the adding means has added a logical value "0" is negative, selective input means to select either of the input data or the data with reversed bits, bit detecting means to search the input data bits from the most significant bit for the bit position where "1" appears for the first time, and shift amount calculating means to determine the shift amount from the bit position data obtained by the bit detecting means.

According to another preferred embodiment, the adding means to add a logical value "0" comprises bit lines for input of n bit data to be normalized and at least one additional bit line connected to ground potential.

According to still another preferred embodiment, a shift amount detector to determine the shift amount for normalization of binary bit data comprises adding means to add a logical value "0" consisting of at least one bit at the side of the least significant bit of an n bit input data to be normalized, bit reversing means to reverse the bits of a data when the data to which the adding means has added a logical value "0" is positive, selective input means to select either of the input data or the data with reversed bits, bit detecting means to search the input data bits from the most significant bit for the bit position where "0" appears for the first time, and shift amount calculating means to determine the shift amount from the bit position data obtained by the bit detecting means.

According to a further preferred embodiment, the adding means to add a logical value "0" comprises bit lines for input of n bit data to be normalized and at least one additional bit line connected to ground potential.

Other objects, characteristics and effects of the present invention will be clarified in the detailed description below.

DESCRIPTION OF THE PREFERRED EMBODIMENT

Figure 1:
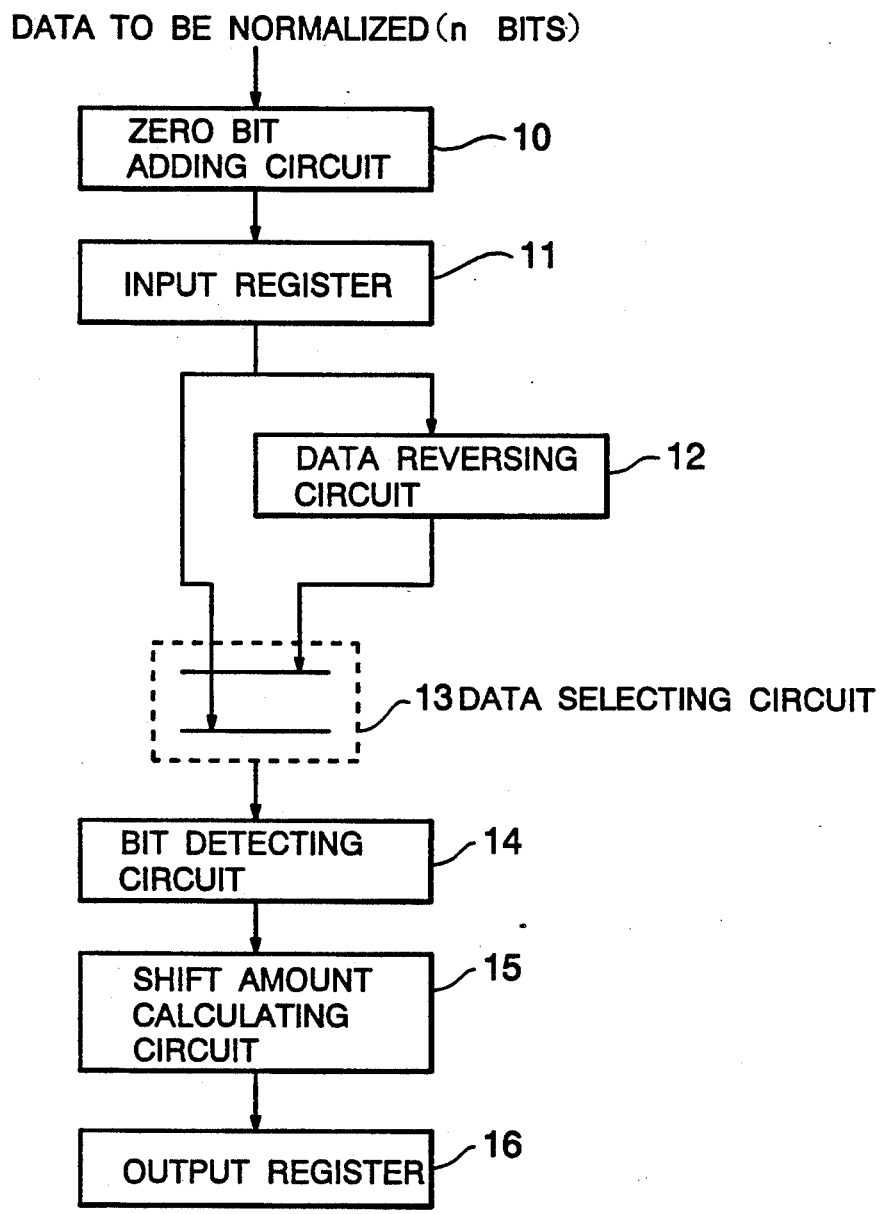
FIG. 1 is a block diagram to show the configuration of a bit data shift amount detector according to a first embodiment of the present invention.
Figure 2:
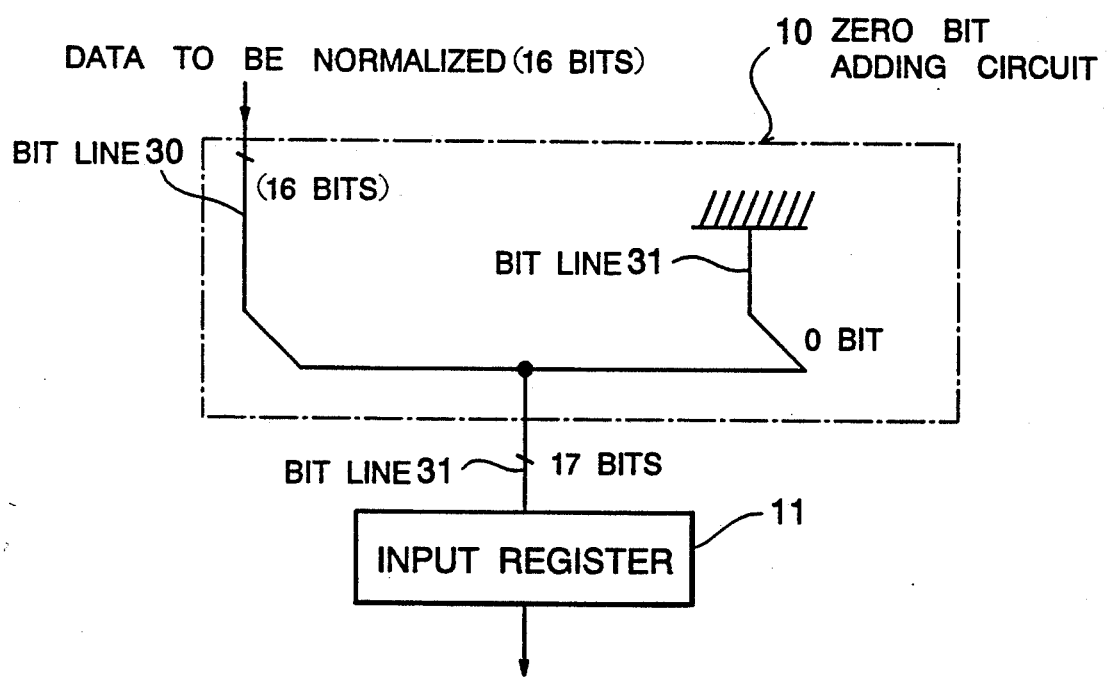
FIG. 2 is a diagram to show the specific configuration of a zero bit adding circuit of the bit data shift amount detector shown in FIG. 1.
Figure 3:
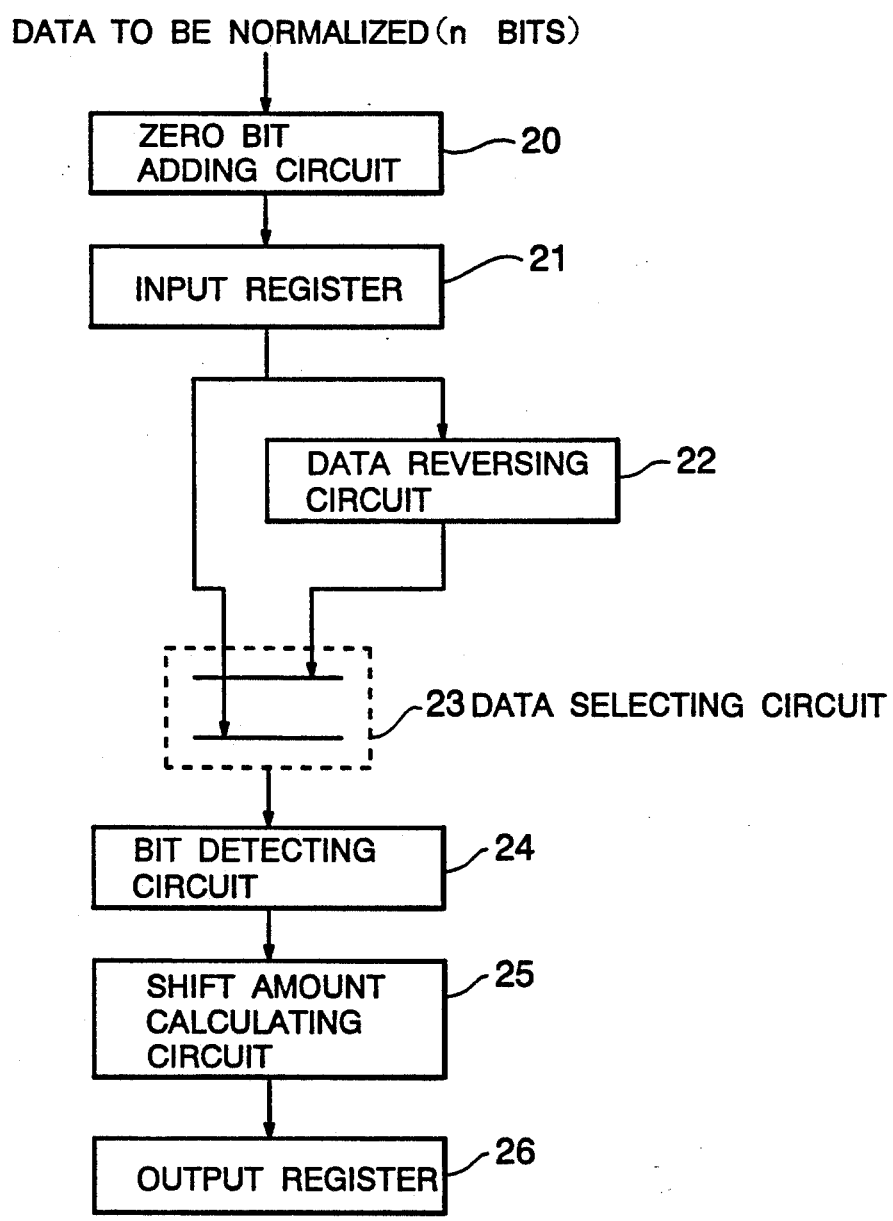
FIG. 3 is a block diagram to show the configuration of a bit data shift amount detector according to a second embodiment of the present invention.

Referring to FIGS. 1 to 3, preferred embodiments of the present invention are now described. FIG. 1 shows the configuration of a bit data shift amount detector according to a first embodiment of the present invention. In FIG. 1, a shift amount detector of this embodiment comprises a zero bit adding circuit 10 to add a bit having logical value of "0" to the input data, an input register 11 to store the input data, a data reversing circuit 12 to reverse the bits when the input data is negative, a data selecting circuit 13 to select data depending on whether the input data is positive or negative, a bit detecting circuit 14 to detect the bit position where the bit value becomes "1" in binary notation for the first time, a shift amount calculating circuit 15 to determine the shift amount to the left from the bit position detected by the bit detecting circuit 14, and an output register 16 to store the value of the left shift amount.

The zero bit adding circuit 10 adds a one bit logical value "0" to the input data (or n bit data to be normalized) after the least significant bit. The n bit data to be normalized include, for example, twos complement data consisting of n bits with the initial bit being the sign bit to indicate whether the data is positive or negative. After one-bit logical value "0" is added, n bit data to be normalized is stored in the input register 11.

As the zero bit adding circuit 10, a circuit as shown in FIG. 2 is used, for example. In the figure, the input data to be normalized has 16 bits. Specifically, the zero bit adding circuit 10 comprises sixteen bit lines 30 to input 16 bit data and a bit line 31 connected to the ground potential. From the zero bit adding circuit 10, 17 bit data consisting of the original 16 bit data and an additional bit is sent to the input register 11 via a bit line 31. In such a circuit configuration, the bit line 31 is designed to add one bit after the least significant bit of the data input through the bit lines 30 for 16 bits. Since the bit line 31 for one bit is connected to the ground potential, one bit data "0" is added after the least significant bit of the 16 bit input data if the ground potential is specified to have a logical value "0".

The data reversing circuit 12 reverses before output all bits of a data when the data stored in the input register 11 is negative. The data selecting circuit 13 selects either the data in the input register 11 (when the data is positive) or the data with bits reversed by the data reversing circuit 12 (when the data is negative) and inputs the selected data to the bit detecting circuit. As this data selecting circuit 13, a multiplexer or other similar circuit is used.

The bit detecting circuit 14 checks the bit values of the input data from the most significant bit to the least significant bit to search for the first bit where the bit value is a binary "1". Specifically, the circuit outputs the position of the bit where the value "1" appears for the first time excluding the sign bit at the beginning of the input data to the shift amount calculating circuit 15. The shift amount calculating circuit 15 determines the shift amount to the left for normalization based on the bit position received and outputs it to the output register 16.

The arithmetic and logic unit normalizes a data by shifting the data to be normalized by the left shift amount stored in the output register 16.

Next, the operation of the shift amount calculating circuit configured as above is described.

Firstly, an example where 16 bit data is normalized is described. Suppose the data to be normalized input to the zero bit adding circuit 10 is "1111H" (H indicates that the number is given in hexadecimal 10 notation). Since hexadecimal "1111H" can be expressed as a 16 bit data "0001000100010001" in binary notation. When a "0" is added after the least significant bit by the zero bit adding circuit 10, this data becomes "00010001000100010" (=02222H). This "02222H" is stored to the input register 11. Since this value is "positive" (i.e. the initial sign bit is "0"), the data selecting circuit 13 selects the value in the input register 11 as it is and outputs it to the following bit detecting circuit 14. The bit detecting circuit 14 checks all bits of the input data "02222H" except the initial sign bit one by one starting from the most significant bit and detects the position of the bit where the bit value is "1" for the first time. In this example, the input data is "00010001000100010" (=02222H) and, excluding the initial sign bit, the bit string "001" subsequent to the initial bit contains the first "1" as the bit value. This bit string "001" is output to the shift amount calculating circuit 15 as bit position detection data. The shift amount calculating circuit 15 stores "2" to the output register 16 as the left shift amount since "1" appears at the third bit of the bit position detection data "001" sent from the bit detecting circuit 14. In this case, binary data "10" representing "2" is stored to the output register 16.

Another example where the data to be normalized input to the zero bit adding circuit 10 is (FEEFH) is now described. The hexadecimal value "FEEFH" can be expressed as a 16 bit data "1111111011101111" in binary notation. When the zero bit adding circuit 10 adds a "0" after the least significant bit, the data becomes "11111110111011110" (=1FDDEH). This "1FDDEH" is stored to the input register 11. Since this value is negative (or the initial sign bit is "1"), the data selecting circuit 13 does not select the value in the input register 11, but selects "00000001000100001" (=00221H), which is obtained by reversing the bits at the data reversing circuit 12. Then, this data is output to the following bit detecting circuit 14. The bit detecting circuit 14 checks all bits of the input data "00221H" except the initial sign bit one by one starting from the most significant bit. It detects the position of the bit where the bit value is "1" for the first time. In this example, the input data is "00000001000100001", and, excluding the initial sign bit, the subsequent bit string "0000001" contains "1" appearing for the first time. This bit string is output to the shift amount calculating circuit 15 as the bit position detection data. The shift amount calculating circuit 15 finds that "1" appears at the seventh bit of the bit position detection data "0000001" sent from the bit detecting circuit 14, and stores "6" to the output register 16 as the left shift amount. In this case, the binary data "110" representing "6" is stored to the output register 16.

A final example is for a 16 bit data "FFFFH" having "1" for all bits, which has been conventionally treated by exception processing. The hexadecimal number (FFFFH) can be expressed as a 16 bit data "1111111111111111" in binary notation, and this becomes "11111111111111110" (=1FFFEH) when the zero bit adding circuit 10 adds a "0" after the least significant bit. This "1FFFEH" is stored to the input register 11. Since this value is negative, the data selecting circuit 13 does not select the data in the input register 11. It selects "00000000000000001" (=00001H) obtained by reversing of bits a the data reversing circuit 12 and outputs it to the following bit detecting circuit 14. The bit detecting circuit 14 checks all bits of the input data "00001H" except the initial sign bit one by one starting from the most significant bit and detects the position of the bit where the bit value becomes "1" for the first time. In this example, the input data is "00000000000000001" and, excluding the initial sign bit, the subsequent bit string "0000000000000001" contains the first "1" as the bit value. This string is output to the shift amount calculating circuit 15 as the bit position detection data. The shift amount calculating circuit 15 finds "1" at the sixteenth bit of the bit position detection data "0000000000000001" sent from the bit detecting circuit 14, and stores "15" to the output register 16 as the left shift amount. In this case, the binary data "1111" is stored to the output register 16. Thus, with this embodiment, the shift amount for the bit data whose bits are all "1" can be exactly determined without conventional exception processing. It is understood that, for an n bit data "FFFF...FFH" having "1" for all bits, too, the left shift amount can be determined as (n−1) through the procedure similar to the one above. Therefore, even if the data to be normalized is an n bit data "FFFF...FFH", the operation can be performed without any troublesome exception processing.

FIG. 3 is a block diagram to show the configuration of a shift amount detector according to a second embodiment of the present invention. This embodiment includes a zero bit adding circuit 20 and an input register 21 to store input data, both having exactly the same configuration as the first embodiment shown in FIG. 1. This embodiment, however, is provided with a data reversing circuit 22 which, contrary to the data reversing circuit 12 in FIG. 1, reverses all bits of a data before output when the data stored to the input register 21 is positive. In addition, a data selecting circuit 23 selects the data in the input register 21 when the data is negative and the data with reversed bits when the data is positive and inputs the selected one to a bit detecting circuit 24.

The bit detecting circuit 24 according to this embodiment checks the bit values of the input data one by one starting from the most significant bit and going down to the least significant bit to search for the first bit where the bit value is a binary "0". Specifically, the position of the bit where "0" appears for the first time (excluding the sign bit at the beginning of the input data) is output to the shift amount calculating circuit 25. The shift amount calculating circuit 25 determines the left shift amount for normalization based on the bit position received and outputs it to the output register 26.

The operation of the shift amount detector according to the second embodiment is now described according to an example where the input data is a 16 bit value "FFFFH" having "1" for all bit values, which has been conventionally subjected to exception processing. When the zero bit adding circuit 20 adds a "0" after the least significant bit, the data "FFFFH" (="1111111111111111"), becomes "11111111111111110" (=1FFFEH). This "1FFFEH" is stored to the input register 21. Since this value is negative, the data selecting circuit 23 selects the value in the input register 21 as it is and outputs it to the following bit detecting circuit 24.

The bit detecting circuit 24 checks all bits of the input data "1FFFEH" except the initial sign bit one by one starting from the most significant bit. It detects the position of the bit where "0" appears for the first time. In this example, the input data is "11111111111111110" and, excluding the initial sign bit, the subsequent bit string "1111111111111110" contains the first "0". This bit string is output to the shift amount calculating circuit 25 as the bit position detection data. The shift amount calculating circuit 25 finds "0" at the sixteenth bit of the bit position detection data "1111111111111110" sent from the bit detecting circuit 24 and stores "15" to the output register 26 as the left shift amount. In this case, "1111", which is a binary data representing "15", is stored to the output register 26. Thus, with this embodiment, the shift amount for the bit data whose bits are all "1" can be exactly determined without exception processing as in the first embodiment.

As described in the above embodiments, when normalizing an n bit data, addition of a one bit logical value "0" after the least significant bit enables determination of the shift amount even for an n bit data "FFFF...FFH" by the same procedure as others without any troublesome exception processing. This improves the operation speed.

Obviously various modifications can be made to the above embodiments without departing from the spirit of the present invention. For example, in the above embodiments, a one bit logical value "0" is added to an n bit data to be normalized after the least significant bit, but it is understood that addition of a plurality of bits will bring the same effect. It is intended to cover in the appended claims all such modifications as fall within the true spirit and scope of the invention.

What is claimed is:

1. A shift amount detector for determining a shift amount for normalization of binary bit data, comprising:
    adding means for adding a logical value "0" having at least one bit at a side of a least significant bit of an n bit input data to be normalized,
    bit reversing means for reversing the bits of the n bit input data with said logical value "0" added thereto,
    selective input means for selecting either of said n bit input data having had said logical value "0" added thereto or the data with reversed bits,
    bit detecting means for searching the selected data bits from a position of a most significant bit to detect a bit position where "1" appears for a first time, and
    shift amount calculating means for determining the shift amount based on bit position data obtained by said bit detecting means.

2. A shift amount detector of claim 1, wherein said adding means comprises bit lines for input of said n bit input data to be normalized and at least one additional bit line connected to ground potential.

3. A shift amount detector for determining a shift amount for normalization of binary bit data, comprising:
    adding means for adding a logical value "0" having at least one bit at a side of a least significant bit of an n bit input data to be normalized,
    bit reversing means for reversing the bits of the n bit input data with said logical value "0" added thereto,
    selective input means for selecting either of said n bit input data having said logical value "0" added thereto or the data with reversed bits,
    bit detecting means for searching the selected data bits for from a position of a most significant bit for a bit position where "0" appears for a first time, and
    shift amount calculating means for determining the shift amount based on bit position data obtained by said bit detecting means.

4. A shift amount detector of claim 3, wherein said adding means comprises bit lines for input of said n bit input data to be normalized and at least one additional bit line connected to ground potential.

* * * * *